(12) United States Patent
Tsai et al.

(10) Patent No.: US 10,917,547 B2
(45) Date of Patent: *Feb. 9, 2021

(54) PLASTIC BARREL, CAMERA MODULE, AND ELECTRONIC DEVICE

(71) Applicant: LARGAN PRECISION CO., LTD., Taichung (TW)

(72) Inventors: Chun-Hua Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,556

(22) Filed: Jan. 17, 2020

(65) Prior Publication Data

US 2020/0154013 A1    May 14, 2020

Related U.S. Application Data

(63) Continuation of application No. 16/004,474, filed on Jun. 11, 2018, now Pat. No. 10,574,869, which is a (Continued)

(30) Foreign Application Priority Data

Mar. 23, 2017 (TW) .............................. 106109800 A

(51) Int. Cl.
*H04N 5/225* (2006.01)
*G02B 3/00* (2006.01)
(Continued)

(52) U.S. Cl.
CPC ......... *H04N 5/2254* (2013.01); *G02B 3/0075* (2013.01); *G02B 7/02* (2013.01);
(Continued)

(58) Field of Classification Search
CPC .. H04N 5/2251; H04N 5/2254; H04N 5/2257; G02B 7/02; G02B 3/0075
See application file for complete search history.

(56) References Cited

U.S. PATENT DOCUMENTS 8,390,945 B2    3/2013  Yen
9,019,637 B2    4/2015  Tsai
(Continued)

FOREIGN PATENT DOCUMENTS

JP           08-194146 A    7/1996

*Primary Examiner* — Daniel M Pasiewicz
(74) *Attorney, Agent, or Firm* — McClure, Qualey & Rodack, LLP

(57) ABSTRACT

A plastic barrel including an object-end portion, a holder portion, and a tube portion is proposed. The object-end portion includes an outer object-end surface, an object-end hole, and an inner annular object-end surface. A part of the inner annular object-end surface is connected with the outer object-end surface and surrounding the object-end hole. The holder portion includes a bottom surface, a bottom hole, and an outer bottom side. The bottom surface surrounds the bottom hole and is connected with the outer bottom side. The holder portion further includes cut traces formed by partially removing gate portions. The tube portion includes inner annular surfaces and connects the object-end portion with the holder portion.

11 Claims, 22 Drawing Sheets

Related U.S. Application Data continuation of application No. 15/606,187, filed on May 26, 2017, now Pat. No. 10,027,865.

(51) Int. Cl.
    *G02B 7/02*         (2006.01)
    *G02B 13/00*      (2006.01)
    *G02B 13/16*      (2006.01)

(52) U.S. Cl.
    CPC ........... *G02B 7/021* (2013.01); *H04N 5/2257* (2013.01); *G02B 13/001* (2013.01); *G02B 13/16* (2013.01); *H04N 5/225* (2013.01); *H04N 5/2251* (2013.01)

(56) References Cited

U.S. PATENT DOCUMENTS

| | | |
|---|---|---|
| 10,027,865 B1 | 7/2018 | Tsai et al. |
| 10,205,863 B2 | 2/2019 | Tsai et al. |
| 10,432,837 B2 * | 10/2019 | Tsai ................... H04N 5/2254 |
| 10,574,869 B2 * | 2/2020 | Tsai ................... G02B 7/021 |
| 10,587,788 B2 * | 3/2020 | Tsai ................... H04N 5/2254 |
| 2006/0018041 A1 | 1/2006 | Hirata |
| 2014/0133040 A1 | 5/2014 | Tsai |
| 2017/0280558 A1 | 9/2017 | Ohara et al. |
| 2017/0285292 A1 | 10/2017 | Chen |
| 2017/0299839 A1 | 10/2017 | Weng et al. |

\* cited by examiner

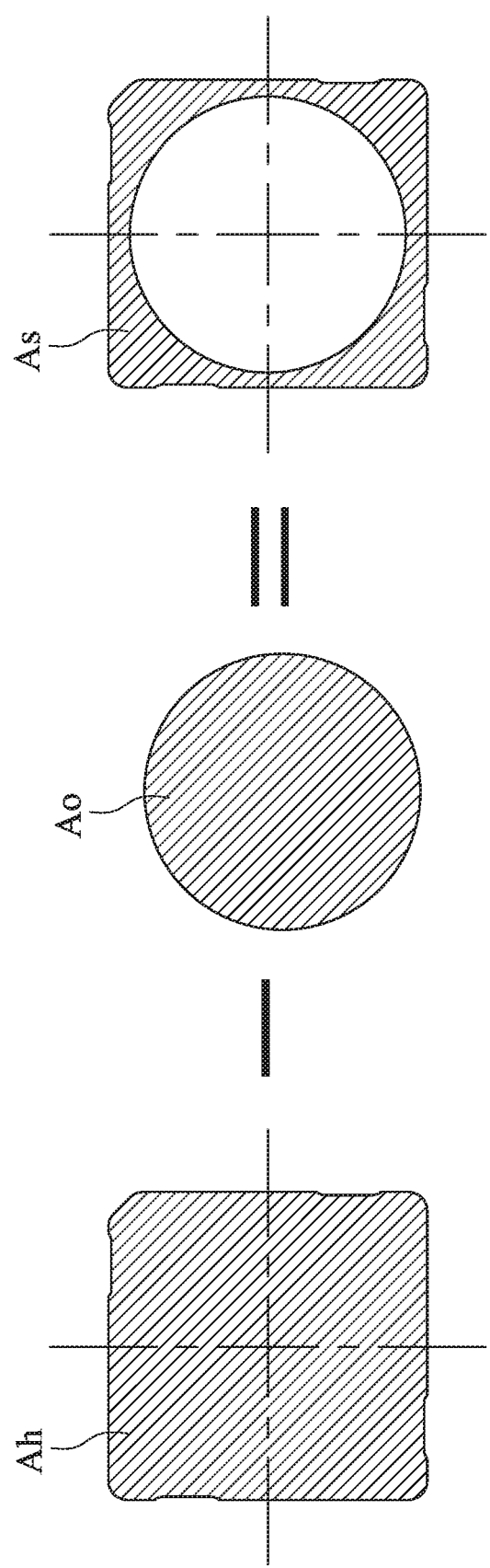

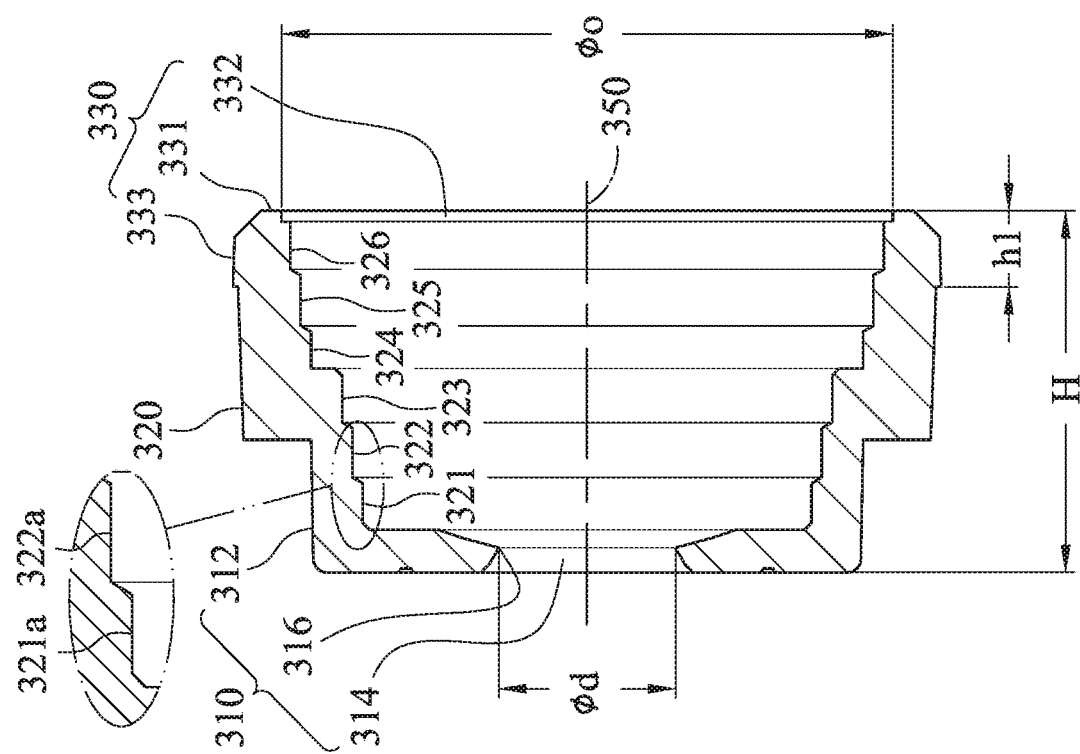

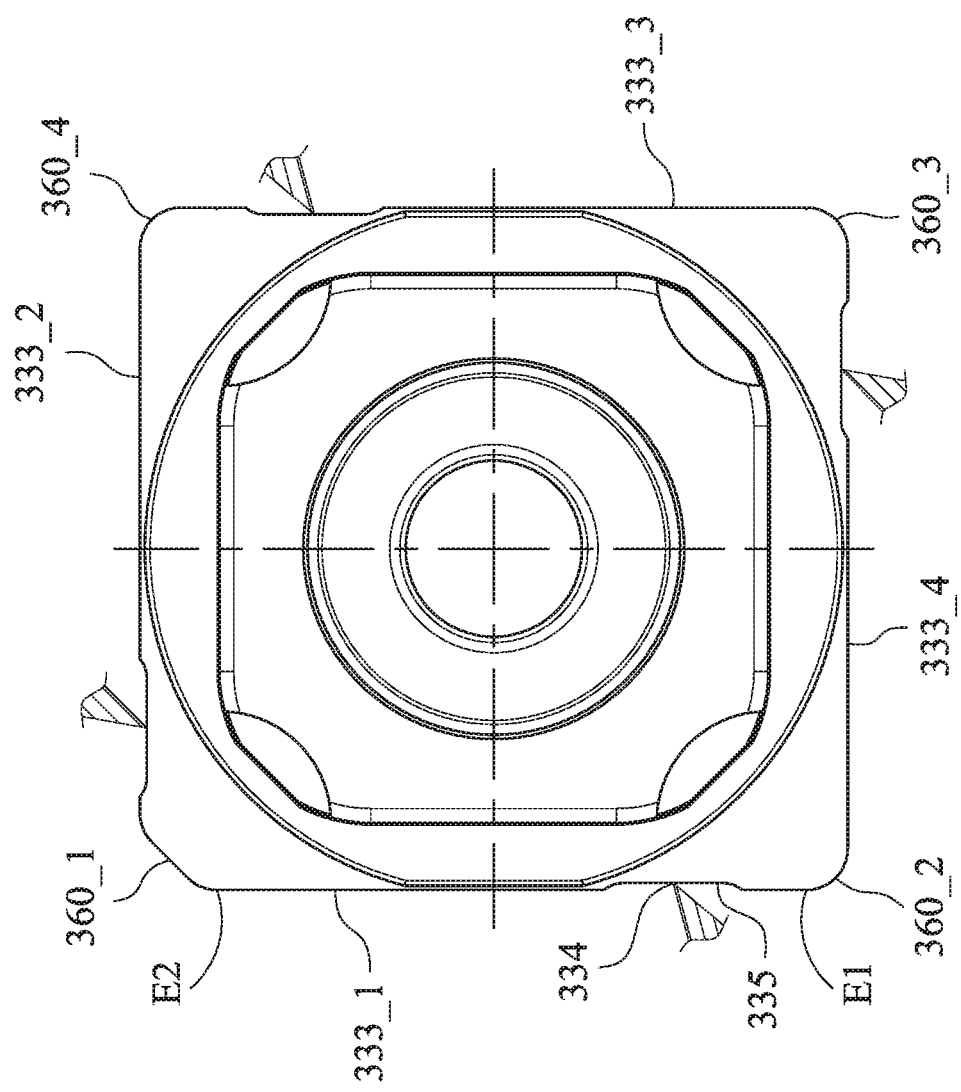

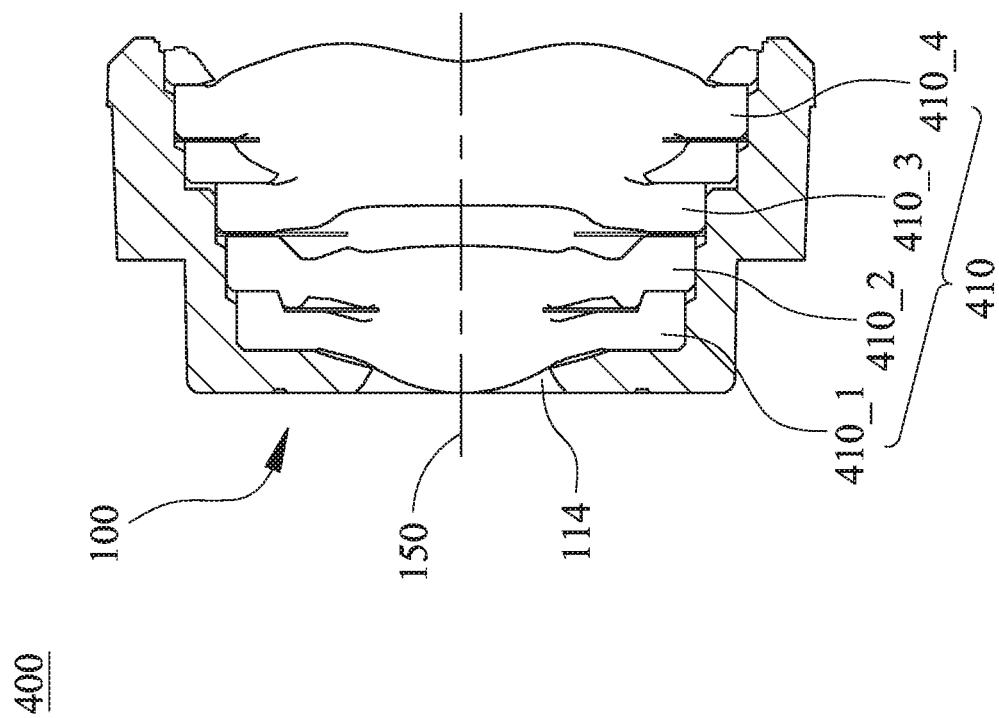

PLASTIC BARREL, CAMERA MODULE, AND ELECTRONIC DEVICE

RELATED APPLICATIONS

The present application is a continuation of the application Ser. No. 16/004,474, filed on Jun. 11, 2018, which is a continuation of the application Ser. No. 15/606,187, filed on May 26, 2017, U.S. Pat. No. 10,027,865 issued on Jul. 17, 2018, and claims priority to Taiwan application serial number 106109800, filed on Mar. 23, 2017, the entire contents of which are hereby incorporated herein by reference.

BACKGROUND

Technical Field

The present disclosure relates to a plastic barrel, a camera module, and an electronic device. More particularly, the present disclosure relates to a plastic barrel, a camera module, and a portable electronic device disposed with the plastic barrel and the camera module.

Description of Related Art

Along with the popularization of personal electronic products and mobile communication products (such as mobile phones and tablets) having imaging devices, miniaturized imaging lens modules have been correspondingly risen and developed, and the demands of miniaturized imaging lens modules having high resolution and great imaging quality significantly increased as well.

A plastic barrel is usually used to receive the lens elements in a camera module and provides an optical distance between any two of the lens elements, and the structure of the plastic barrel correspondingly affects the imaging quality of the camera module.

Most of conventional plastic barrels are screwed on image sensors, which often produces dust during the procedure of assembling. Moreover, when the axis of the screw is misaligned, the assembled camera may tilt, and hence the imaging quality may be affected.

To solve this problem, the plastic barrels that connect with the image sensor via a holder portion are provided in the market. However, it is difficult for the current manufacturing process to make the surface of the holder portion facing the image sensor smooth enough, and hence the camera may still tilt after being assembled. Meanwhile, the assembling tolerance may negatively affect the back focus position as well.

SUMMARY

The present disclosure provides a plastic barrel including an object-end portion, a holder portion, and a tube portion. The object-end portion includes an outer object-end surface, an object-end hole, and an inner annular object-end surface. A part of the inner annular object-end surface is connected with the outer object-end surface and surrounds the object-end hole. The holder portion includes a bottom surface, a bottom hole, and an outer bottom side, wherein the bottom surface surrounds the bottom hole and connected with the outer bottom side, and the holder portion further comprises at least three cut traces obtained by partially removing at least three gate portions. The tube portion connects the object-end portion with the holder portion and includes a plurality of inner annular surfaces. An area of the bottom surface is As, a diameter of the bottom hole is $\psi o$, and the following condition is satisfied: $0.19 < As/Ao < 1.5$, wherein $Ao = \pi \times (\psi o/2)^2$.

The present disclosure provides a camera module including the aforementioned plastic barrel and an optical lens assembly disposed in the plastic barrel.

The present disclosure provides an electronic device including the aforementioned camera module and an image sensor connected with the camera module.

BRIEF DESCRIPTION OF THE DRAWINGS

The present disclosure can be more fully understood by reading the following detailed description of the embodiment, with reference made to the accompanying drawings as follows:

FIG. 1D is a schematic view of a parameter As according to the 1st embodiment of the present disclosure;

FIG. 3C is a side cross-sectional view of the plastic barrel according to the 3rd embodiment of the present disclosure;

FIG. 3E is a top view of the plastic barrel according to the 3rd embodiment of the present disclosure;

FIG. 4 is a schematic view of a camera module according to the 4th embodiment of the present disclosure;

DETAILED DESCRIPTION

1st Embodiment

Figure 1A:
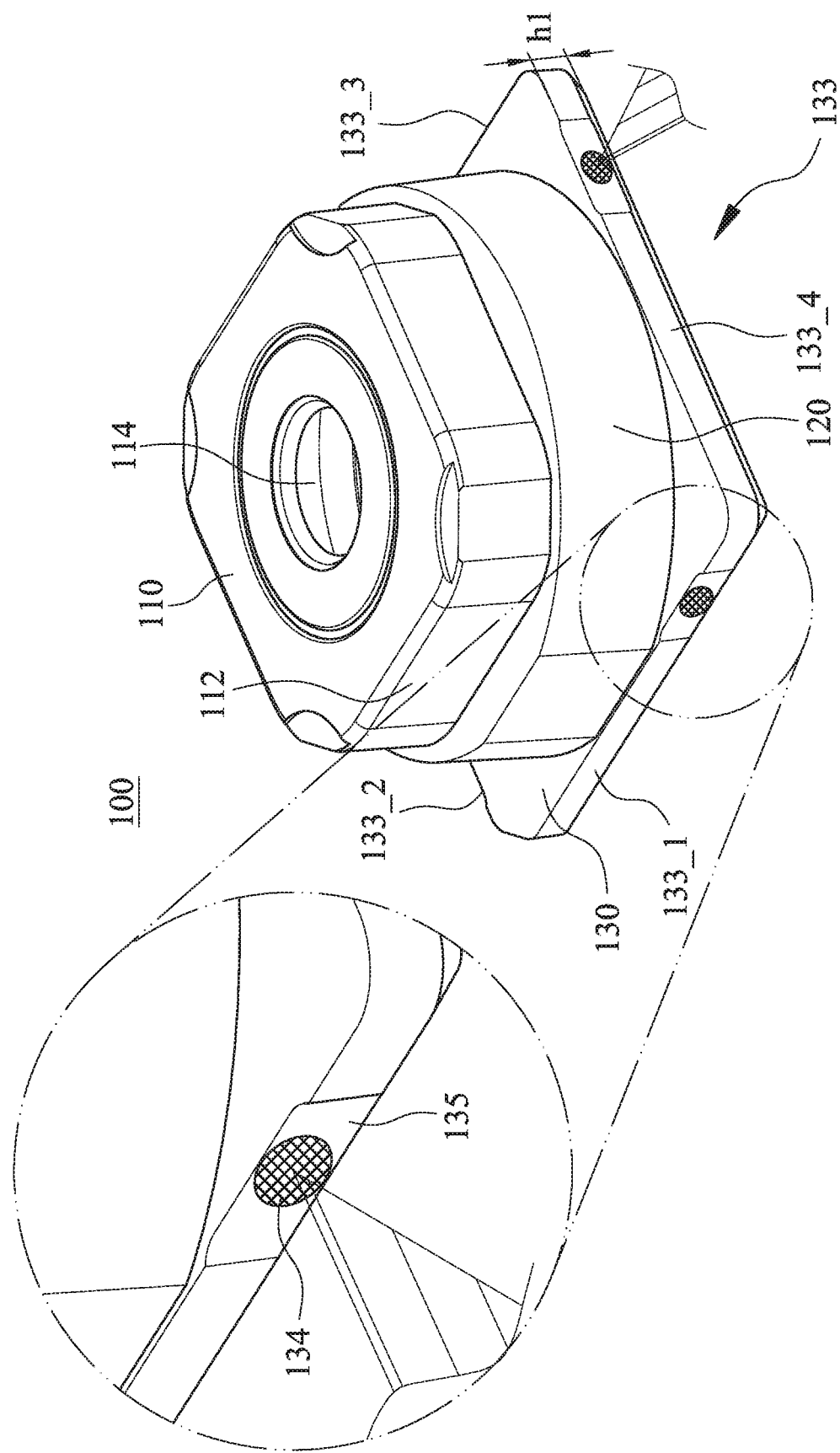
FIG. 1A is a schematic view of a plastic barrel according to the 1st embodiment of the present disclosure.
Figure 1B:
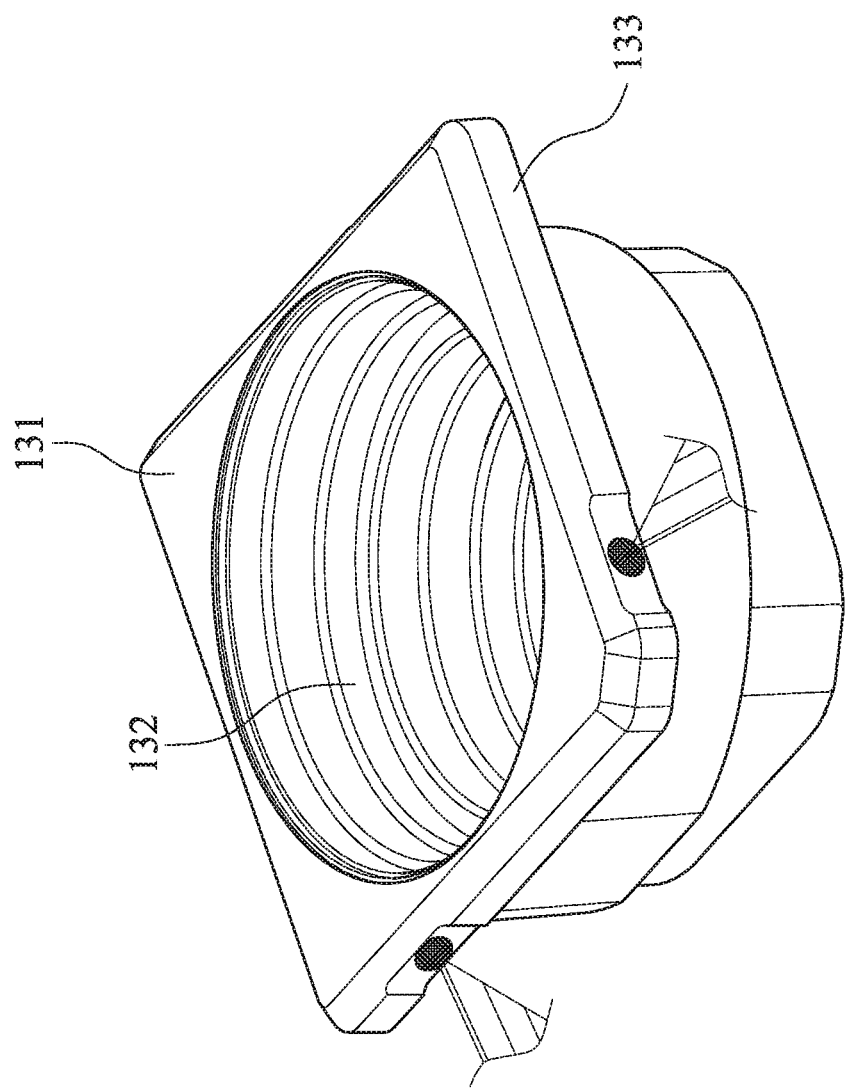
FIG. 1B is another schematic view of the plastic barrel according to the 1st embodiment of the present disclosure.
Figure 1C:
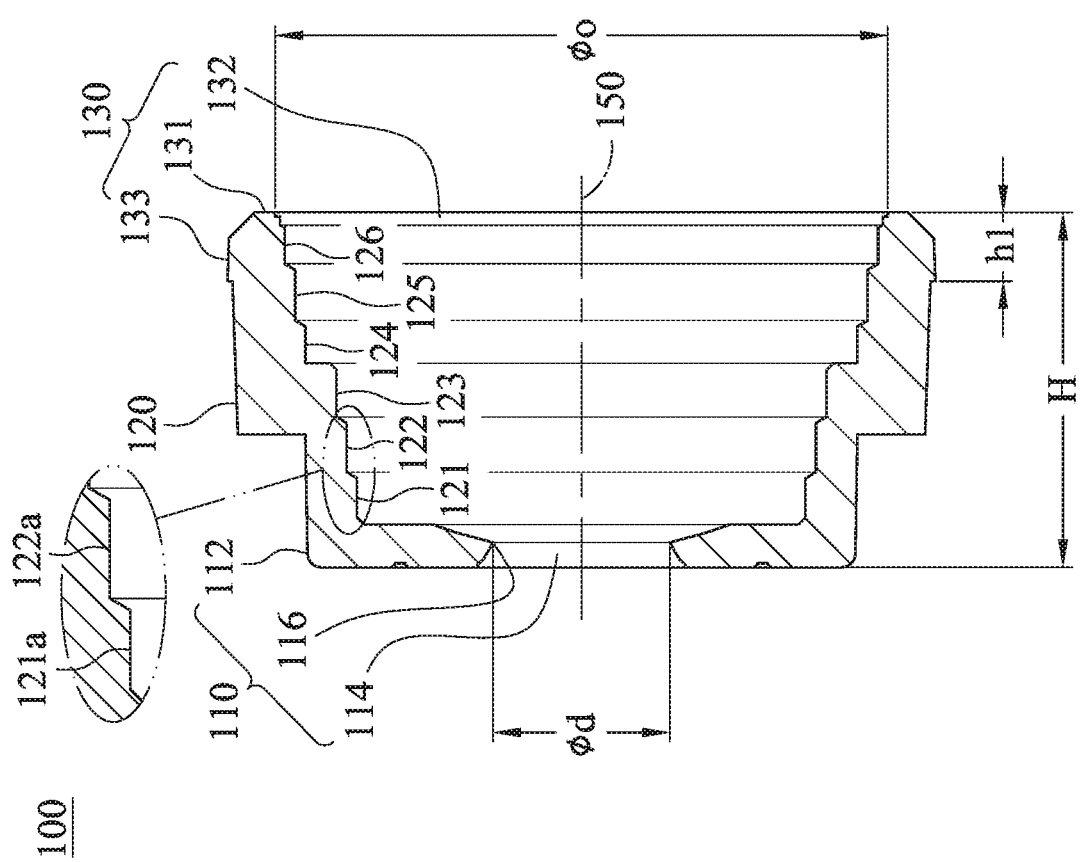
FIG. 1C is a side cross-sectional view of the plastic barrel according to the 1st embodiment of the present disclosure.

FIG. 1A is a schematic view of a plastic barrel 100 according to the 1st embodiment of the present disclosure;

FIG. 1B is another schematic view of the plastic barrel 100 according to the 1st embodiment of the present disclosure; FIG. 1C is a side cross-sectional view of the plastic barrel 100 according to the 1st embodiment of the present disclosure. In FIG. 1A to FIG. 1C, the plastic barrel 100 includes an object-end portion 110, a tube portion 120, and a holder portion 130. The object-end portion 110 includes an outer object-end surface 112, an object-end hole 114, and an inner annular object-end surface 116. A part of the inner annular object-end surface 116 is connected with the outer object-end surface 112 and surrounds the object-end hole 114. The holder portion 130 may include a bottom surface 131, a bottom hole 132, and an outer bottom side 133. The bottom surface 131 surrounds the bottom hole 132 and is connected with the outer bottom side 133.

The tube portion 120 connects the object-end portion 110 with the holder portion 130. The tube portion 120 includes a plurality of inner annular surfaces 121, 122, 123, 124, 125, and 126, wherein the inner annular surfaces 121-126 of the tube portion 120 may form at least six parallel inner annular surfaces (e.g., 121*a* and 122*a*) to prevent the injection quality of the object-end portion 110 from being affected by the overly thick regions of the tube portion 120. Specifically, in FIG. 1C, the six parallel inner annular surfaces of the 1st embodiment are located on the inner annular surfaces 121-126, respectively. Accordingly, the injection may flow more smoothly during the injection molding process via properly arranging the plurality of parallel inner annular surfaces.

FIG. 1D is a schematic view of a parameter As according to the 1st embodiment of the present disclosure. In FIG. 1C and FIG. 1D, when an area of the bottom surface 131 is As, and a diameter of the bottom hole 132 is $\psi o$, the following condition can be satisfied: $0.19 < As/Ao < 1.5$, wherein $Ao = \pi \times (\psi o/2)^2$, which is the cross-sectional area of the bottom hole 132. In FIG. 1D, the cross-sectional area of the holder portion 130 is Ah, i.e., the area surrounded by the outer bottom side 133, and the area As of the bottom surface 131 can be obtained by subtracting the cross-sectional area of the bottom hole 132 from the cross-sectional area of the holder portion 130 (i.e., As=Ah−Ao), but the present disclosure is not limited thereto. Preferably, the following condition can be satisfied: $0.34 < As/Ao < 1.2$. Accordingly, a better balance between the smoothness of the bottom surface 131 and the miniature of the plastic barrel 100 can be further achieved.

In FIG. 1A, the holder portion 130 further includes at least three cut traces 134 which can be obtained by partially removing at least three gate portions 135.

Figure 1E:
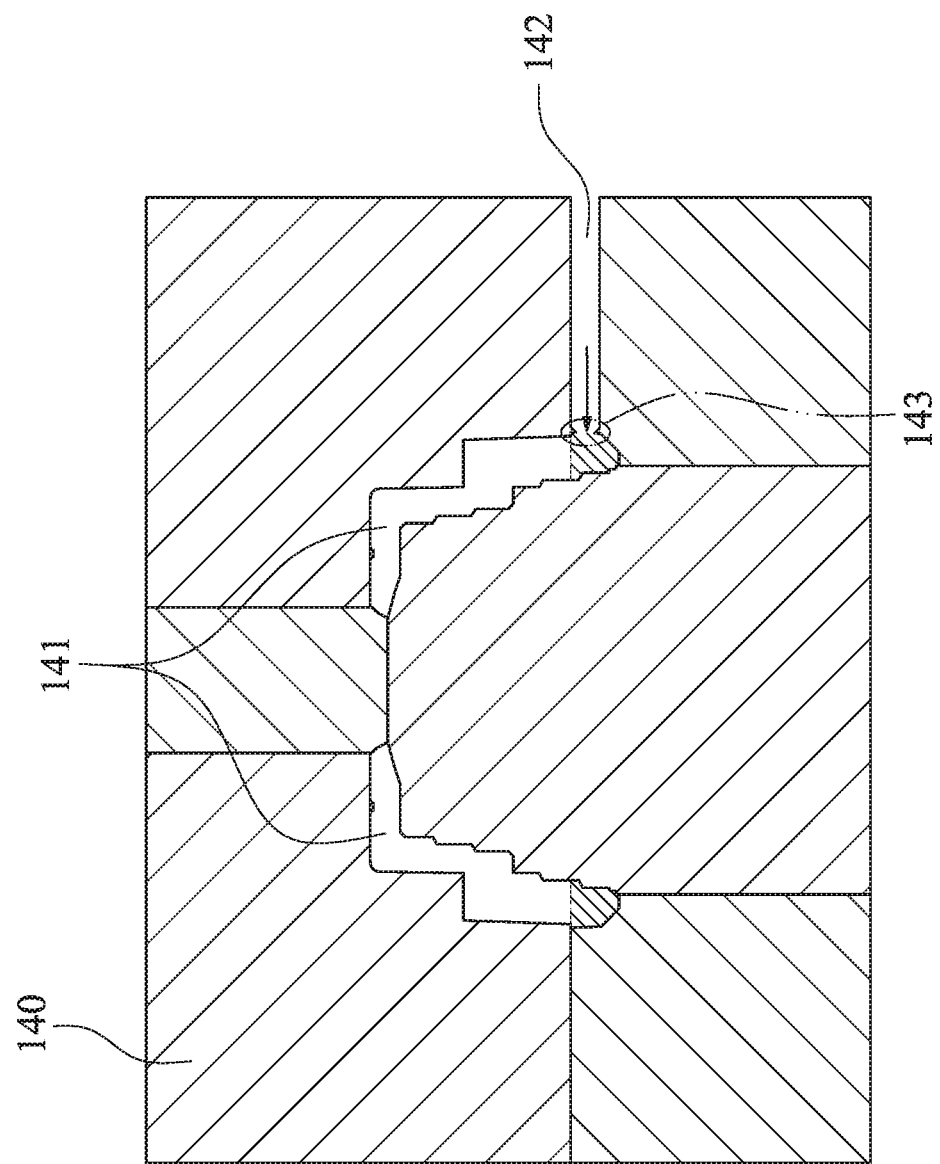
FIG. 1E is a cross-sectional view of a mold used during the manufacturing process of the plastic barrel according to FIG. 1A.

FIG. 1E is a cross-sectional view of a mold 140 used during the manufacturing process of the plastic barrel 100 according to FIG. 1A. In FIG. 1E, during the injection molding process of manufacturing the plastic barrel 100, the injection is injected into a chamber 141 of the mold 140 via an injection channel 142. A molding gate 143 is disposed between the injection channel 142 and the chamber 141 and corresponds to the cut trace 134 of the holder portion 130. After the injection hardened and separated from the mold 140, the position where the molding gate 143 corresponds to the holder portion 130 will exist some residual hardened materials, i.e., the gate portion 135. Next, after removing the gate portion 135, the cut trace 134 will be formed on the holder portion 130. Since the design of the molding gate 143 will shape the connection between the gate portion 135 and the holder portion 130 as a descending plane, the corresponding cut trace 134 on the holder portion 130 will not affect the dimensional precision or obstruct subsequent assembling applications after removing the gate portion 135. Accordingly, the injection may flow more smoothly during the injection molding process via the way of forming the gate portions 135 on the holder portion 130, and hence the dimensional precision of the holder portion 130 can be controlled more ideally, and the smoothness of the bottom surface 131 can be guaranteed.

Only one molding gate 143 is illustrated in FIG. 1E due to the cross-sectional viewing angle. However, since the at least three cut traces 134 in FIG. 1A are obtained by respectively removing the at least three gate portions 135 during the injection molding process, the mold 140 has at least three molding gates 143 corresponding to the at least three gate portions 135. Accordingly, the molding of a plastic barrel having a more complicated structure can be facilitated. In addition, the at least three cut traces 134 may accelerate the procedure of cutting and clamping the plastic barrel 100, and hence the cutting knife can be integrated with the clamping arm to improve the cutting efficiency.

In the 1st embodiment, the object-end portion 110, the holder portion 130, and the tube portion 120 of the plastic barrel 100 may be integrally formed as a black plastic via an injection molding process, but the plastic barrel 100 of the present disclosure is not limited thereto. Accordingly, the number of the parts used for manufacturing the plastic barrel 100 can be reduced, the torque problem occurring when the plastic parts are conventionally assembled can be mitigated, and the dust problem resulted from the friction between the plastic parts can be alleviated. Further, by controlling the precision of the mold 140, the problem of the misaligning screw axis that should be considered in the conventional way of using threaded structures can be neglected.

In FIG. 1B and FIG. 1D, the shape of the holder portion 130 (e.g., a rectangle) is different from the shape of the bottom hole 132 (e.g., a circle). Under this situation, a certain structural thickness of the holder portion 130 can be maintained, and hence the dimension of the holder portion 130 will not be too small to obstruct the injection molding process, but the shape of the holder portion 130 is not limited thereto. In other cases, the shape of the holder portion 130 may be a trimmed circle whose diameter is larger than the diameter of the bottom hole 132.

In FIG. 1A and FIG. 1C, when a height of the plastic barrel 100 parallel to a central axis 150 (i.e., the optical axis) is H and a thickness of the holder portion 130 parallel to the central axis 150 is h1, the following condition can be satisfied: $0.04 < h1/(H-h1) < 0.5$. Accordingly, the structural thickness of the holder portion 130 will not be too thick to hinder the imaging quality of the object-end hole 114.

Accordingly, the plastic barrel 100 of the present disclosure may be implemented as a non-threaded structure. Since there's no need to design threads, the developing progress of the mold 140 may be accelerated, and hence the manufacturing efficiency may be improved.

Figure 1F:
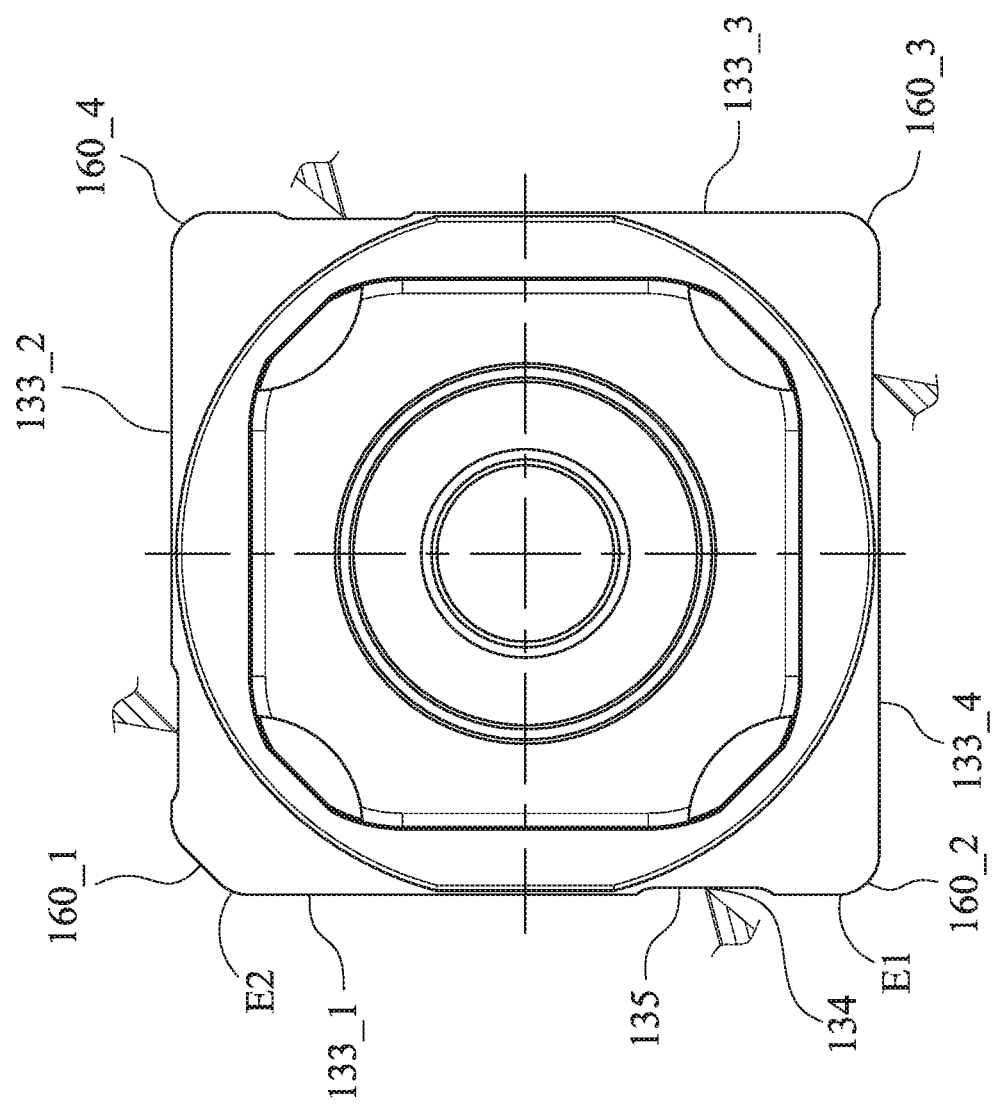
FIG. 1F is a top view of the plastic barrel according to the 1st embodiment of the present disclosure.
Figure 1G:
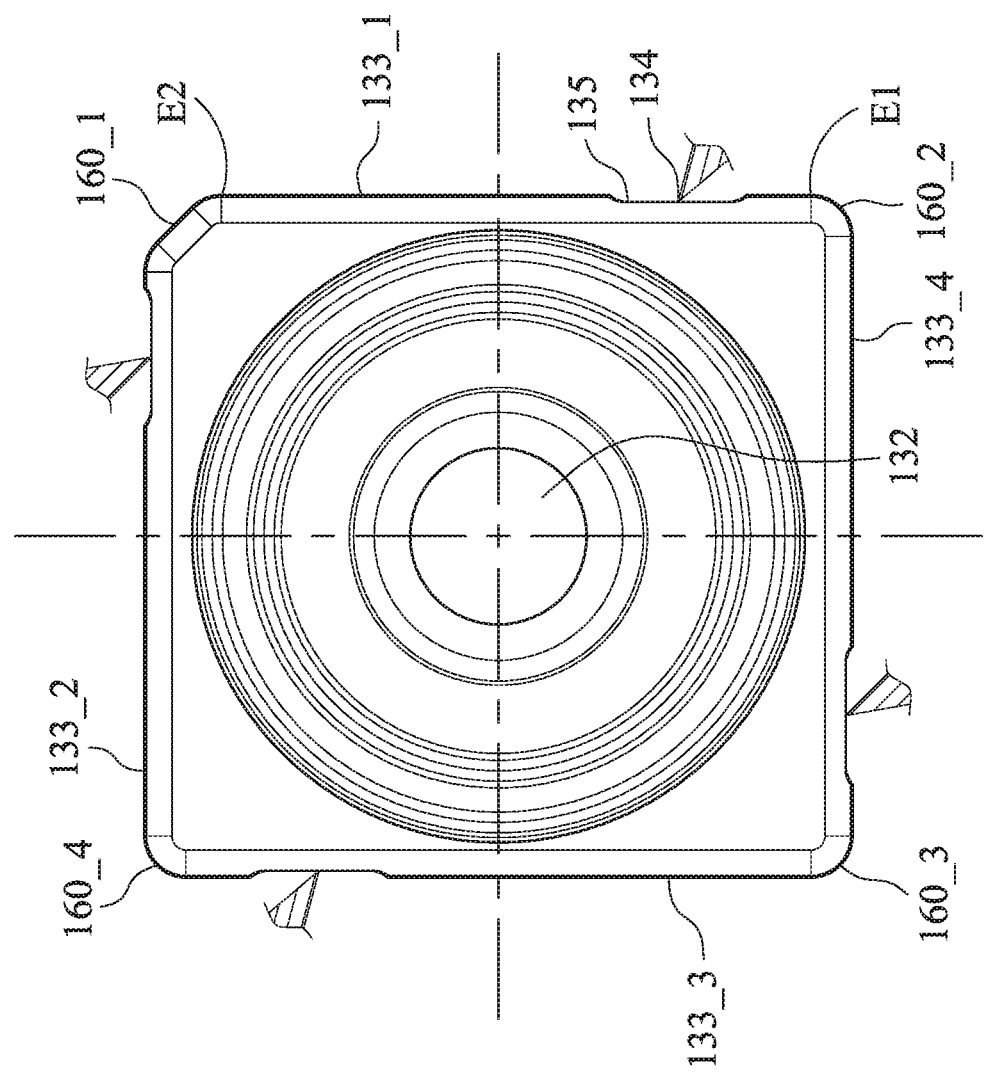
FIG. 1G is a bottom view of the plastic barrel according to the 1st embodiment of the present disclosure.

FIG. 1F is a top view of the plastic barrel 100 according to the 1st embodiment of the present disclosure, and FIG. 1G is a bottom view of the plastic barrel 100 according to the 1st embodiment of the present disclosure. In FIG. 1F and FIG. 1G, the outer bottom side 133 includes at least four side surfaces 133_1, 133_2, 133_3, and 133_4. Each of the side surfaces 133_1-133_4 includes two ends E1 and E2, and one of the ends of one of the side surfaces 133_1-133_4 is connected with one of the ends of another one of the side surfaces 133_1-133_4, wherein the one of the side surfaces 133_1-133_4 is adjacent to the another one of the side surfaces 133_1-133_4. Accordingly, the design of the channel traces of injecting the injection during the injection molding process can be facilitated. In addition, the side surfaces 133_1-133_4 may form four corners 160_1-160_4, wherein the corner 160_1 may be chamfered.

Moreover, the cut traces 134 are respectively located on the side surfaces 133_1-133_4, and each of the cut traces 134 is closer to one of the ends E1 and E2 (e.g., the end E1) of the side surfaces 133_1-133_4. Accordingly, the injection at the thinner places of the hardened plastic barrel 100 will be more uniform. Moreover, when the speed of injecting is faster, the cooling gradients of some parts will not be too large, and hence the plastic inside the plastic barrel 100 can be prevented from having residual stress after cooling down. Further, the existence of the short shot and the sink mark on the bottom surface 131 can be less frequent to facilitate the cutting of the plastic barrel 100, and the operation of the machine cutting the gate portions 135 may be more efficient.

In FIG. 1C, when the area of the bottom surface 131 is As, and a diameter of the object-end hole 114 is $\psi d$, the following condition can be satisfied: $0.8 < As/(\pi \times (\psi d)^2) < 3.6$. Accordingly, the molding quality of the object-end hole 114 can be guaranteed.

When the diameter of the object-end hole 114 is $\psi d$, and the height of the plastic barrel 100 parallel to the central axis 150 is H, the following condition can be satisfied: $1.02 < H/\psi d < 2.8$. Accordingly, the plastic barrel 100 can be designed to fit in optical systems with large aperture stop and short total length. Preferably, the following condition can be satisfied: $1.32 < H/\psi d < 2.42$. Accordingly, the plastic barrel 100 may be applicable to the barrel designs with large aperture stop and short focal length.

When the diameter of the bottom hole 132 is $\psi o$, and the height of the plastic barrel 100 parallel to the central axis 150 is H, the following condition can be satisfied: $1.05 < \psi o/H < 2.5$. Accordingly, the flow of the plastic may be smoother, and hence the injection channels corresponding to the at least three gate portions 135 may be distributed more uniformly rather than overly concentrated.

When the area of the bottom surface 131 is As, and the diameter of the object-end hole 114 is $\psi d$, the following condition can be satisfied: $1.0 < As/(\pi \times (\psi d)^2) < 3.15$. Accordingly, the size of the object-end hole 114 can be prevented from being too small or the area of the bottom surface 131 can be prevented from being too large, and hence the defective products can be less produced, and the efficiency of the injection molding process can be improved.

The following Table 1 lists the data of the plastic barrel 100 defined according to the aforementioned parameters of the 1st embodiment of the present disclosure as shown in FIG. 1C and FIG. 1D.

TABLE 1

| 1st embodiment | | | |
|---|---|---|---|
| $\Psi d$ | 1.28 mm | Ao | 15.48 mm² |
| $\Psi o$ | 4.44 mm | Ah | 25.05 mm² |
| H | 2.574 mm | As | 9.57 mm² |
| h1 | 0.5 mm | | |

2nd Embodiment

Figure 2A:
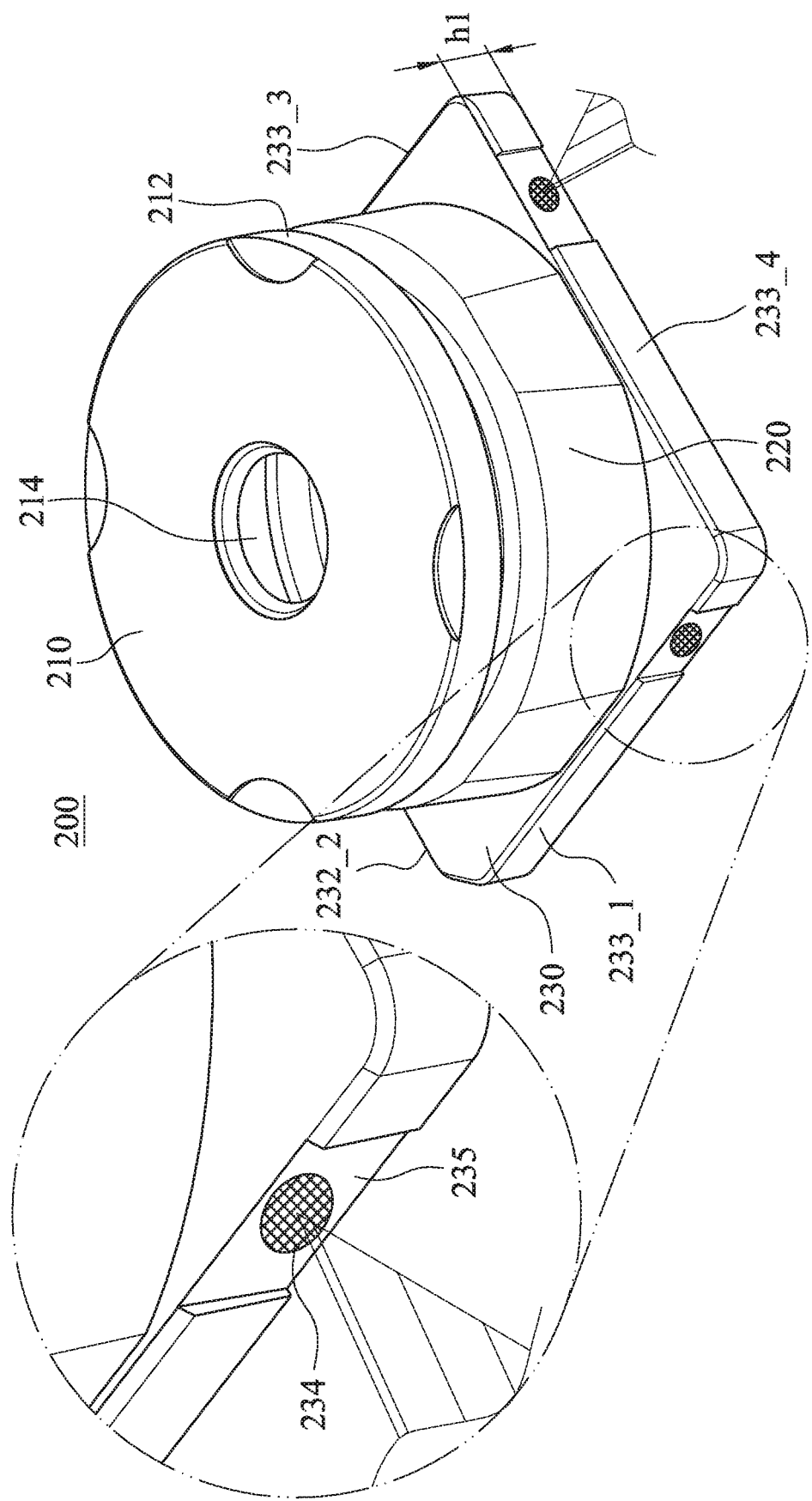
FIG. 2A is a schematic view of a plastic barrel according to the 2nd embodiment of the present disclosure.
Figure 2B:
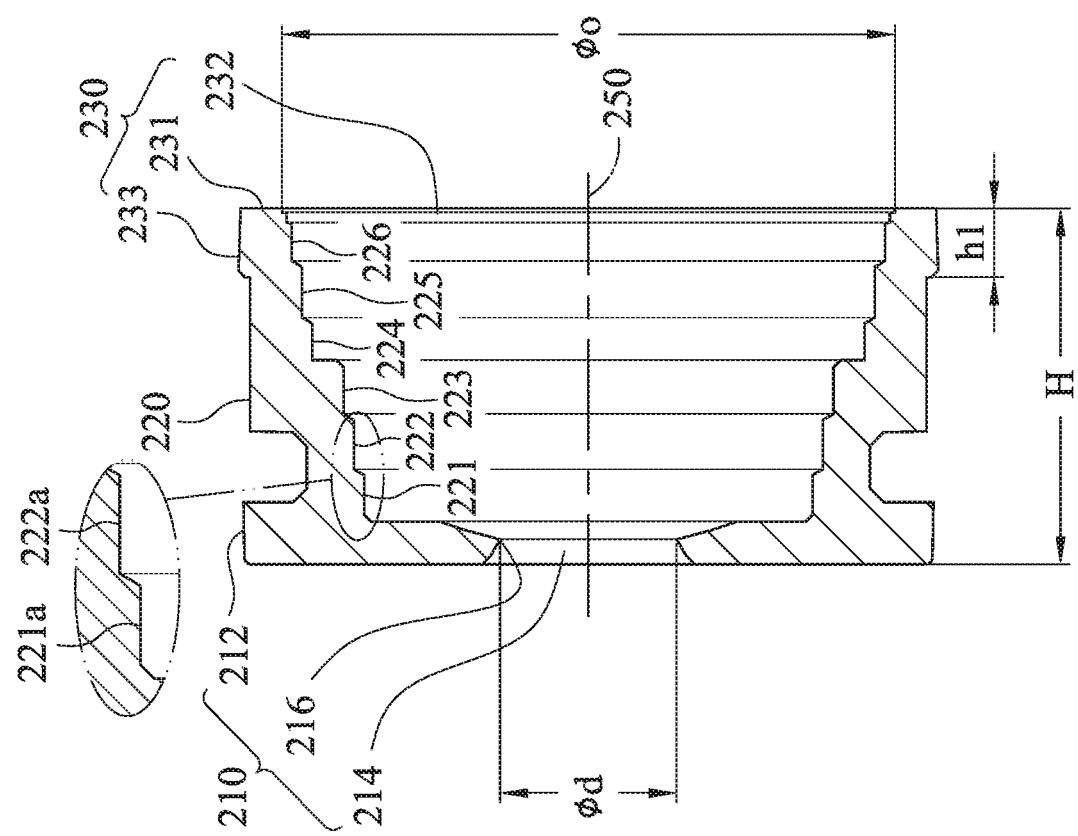
FIG. 2B is a side cross-sectional view of the plastic barrel according to the 2nd embodiment of the present disclosure.

FIG. 2A is a schematic view of a plastic barrel 200 according to the 2nd embodiment of the present disclosure; FIG. 2B is a side cross-sectional view of the plastic barrel 200 according to the 2nd embodiment of the present disclosure. In FIG. 2A and FIG. 2B, the plastic barrel 200 includes an object-end portion 210, a tube portion 220, and a holder portion 230. The object-end portion 210 includes an outer object-end surface 212, an object-end hole 214, and an inner annular object-end surface 216. A part of the inner annular object-end surface 216 is connected with the outer object-end surface 212 and surrounds the object-end hole 214. The holder portion 230 includes a bottom surface 231, a bottom hole 232, and an outer bottom side 233. The bottom surface 231 surrounds the bottom hole 232 and is connected with the outer bottom side 233.

The tube portion 220 connects the object-end portion 210 with the holder portion 230. The tube portion 220 includes a plurality of inner annular surfaces 221, 222, 223, 224, 225, and 226, wherein the inner annular surfaces 221-226 of the tube portion 220 may form at least six parallel inner annular surfaces (e.g., parallel inner annular surfaces 221a and 222a). Specifically, in FIG. 2B, the six parallel inner annular surfaces of the 2nd embodiment are located on the inner annular surfaces 221-226, respectively.

In FIG. 2A, the holder portion 230 may further include at least three cut traces 234 which can be obtained by partially removing at least three gate portions 235. The way of forming the at least three cut traces 234 can be referred to the related discussion of FIG. 1E, which will not be repeated herein. Accordingly, the molding of a plastic barrel having a more complicated structure can be facilitated. In addition, the at least three cut traces 234 may accelerate the procedure of cutting and clamping the plastic barrel 200, and hence the cutting knife can be integrated with the clamping arm to improve the cutting efficiency.

In the 2nd embodiment, the object-end portion 210, the holder portion 230, and the tube portion 220 of the plastic barrel 200 may be integrally formed as a black plastic via an injection molding process.

Figure 2C:
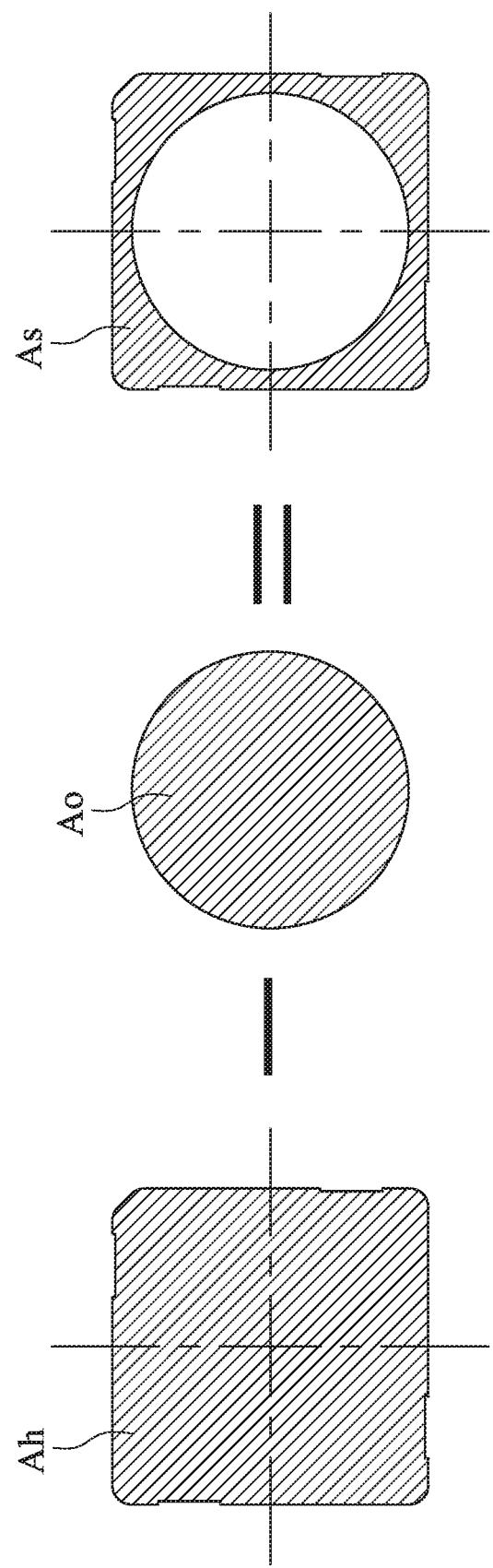
FIG. 2C is a schematic view of a parameter As according to the 2nd embodiment of the present disclosure.

FIG. 2C is a schematic view of a parameter As according to the 2nd embodiment of the present disclosure. In FIG. 2C, the shape of the holder portion 230 (e.g., a rectangle) is different from the shape of the bottom hole 232 (e.g., a circle). In addition, the plastic barrel 200 in the 2nd embodiment is a non-threaded structure.

Figure 2D:
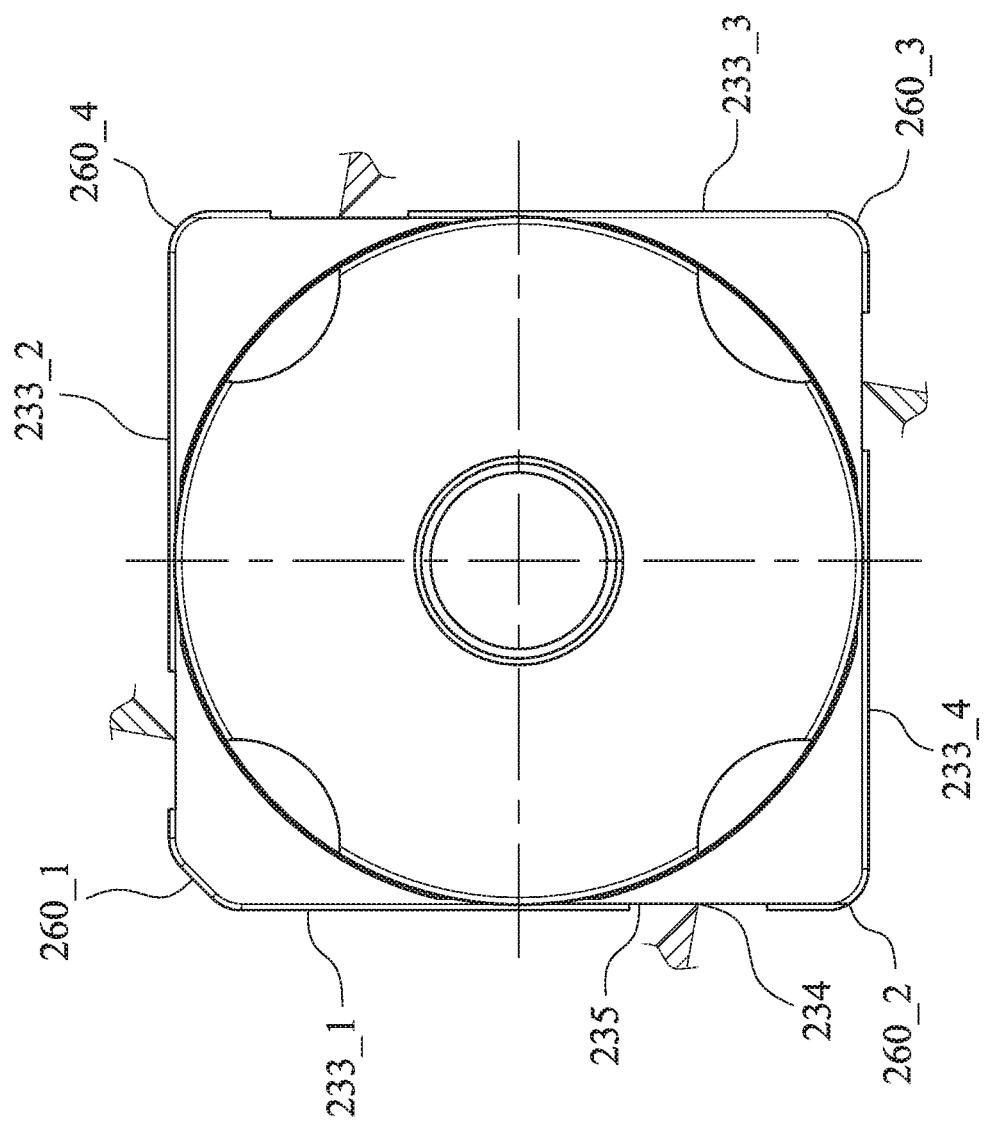
FIG. 2D is a top view of the plastic barrel according to the 2nd embodiment of the present disclosure.
Figure 2E:
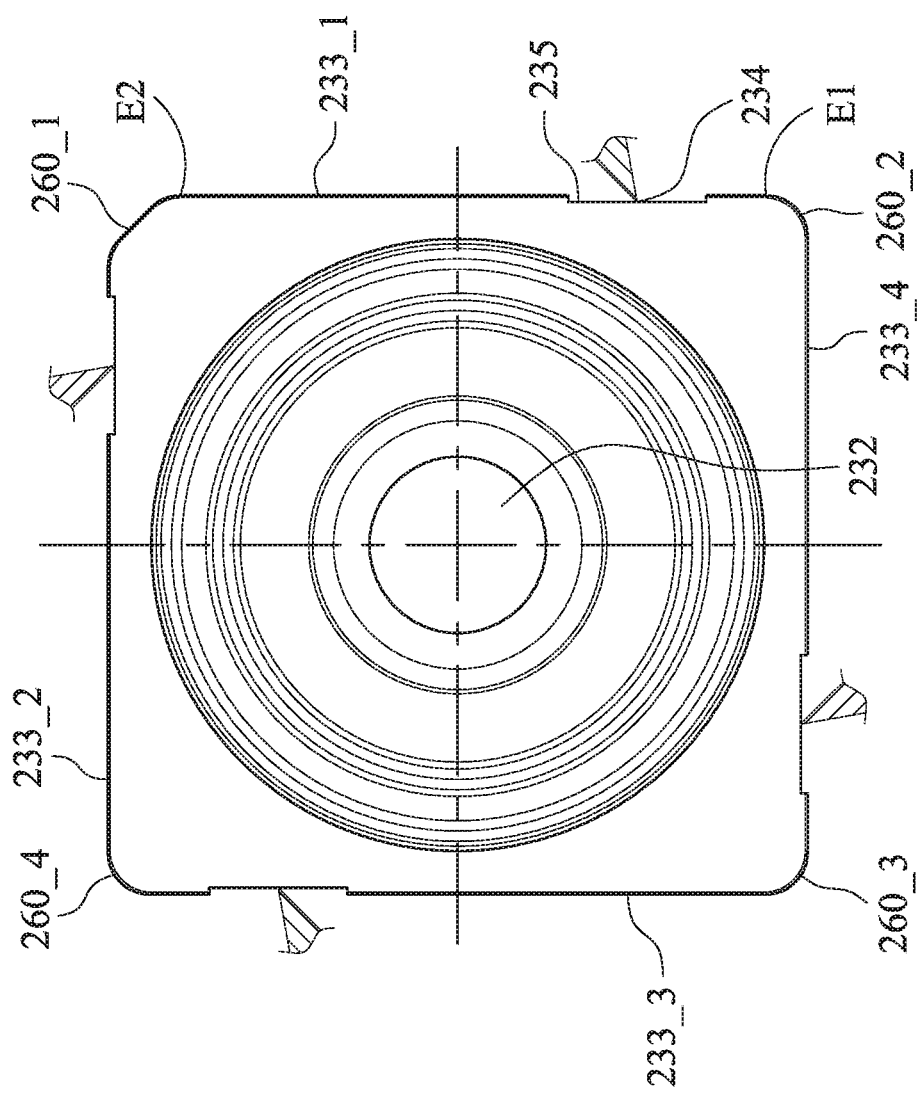
FIG. 2E is a bottom view of the plastic barrel according to the 2nd embodiment of the present disclosure.

FIG. 2D is a top view of the plastic barrel 200 according to the 2nd embodiment of the present disclosure, and FIG. 2E is a bottom view of the plastic barrel 200 according to the 2nd embodiment of the present disclosure. In FIG. 2D and FIG. 2E, the outer bottom side 233 includes at least four side surfaces 233_1, 233_2, 233_3, and 233_4. Each of the side surfaces 233_1-233_4 includes two ends E1 and E2, and one of the ends of one of the side surfaces 233_1-233_4 is connected with one of the ends of another one of the side surfaces 233_1-233_4, wherein the one of the side surfaces 233_1-233_4 is adjacent to the another one of the side surfaces 233_1-233_4. Accordingly, the design of the channel traces of injecting the injection during the injection molding process can be facilitated. Moreover, the cut traces 234 are respectively located on the side surfaces 233_1-233_4, and each of the cut traces 234 is closer to one of the ends E1 and E2 (e.g., the end E1) of the side surfaces 233_1-233_4.

In FIG. 2A, FIG. 2B, and FIG. 2C of the 2nd embodiment, an area of the bottom surface 231 is As, a cross-sectional area of the holder portion 230 is Ah (i.e., the area surrounded by the outer bottom side 233), and the area As of the bottom surface 231 can be obtained by subtracting the cross-sectional area of the bottom hole 232 from the cross-sectional area of the holder portion 230 (i.e., As=Ah−Ao). A diameter of the bottom hole 232 is $\psi o$, wherein $Ao = \pi \times (\psi o/2)^2$, i.e., the cross-sectional area of the bottom hole 232. A height of the plastic barrel 200 parallel to a central axis 250 (i.e., the optical axis) is H, a thickness of the holder portion 230 parallel to the central axis 250 is h1, and a diameter of the object-end hole 214 is ψd. The following Table 2 lists the data of the plastic barrel 200 defined according to the aforementioned parameters of the 2nd embodiment of the present disclosure as shown in FIG. 2A, FIG. 2B, and FIG. 2C.

TABLE 2

| 2nd embodiment | | | |
|---|---|---|---|
| Ψd | 1.28 mm | Ao | 15.48 mm² |
| Ψo | 4.44 mm | Ah | 25.37 mm² |
| H | 2.582 mm | As | 9.89 mm² |
| h1 | 0.5 mm | | |

3rd Embodiment

Figure 3A:
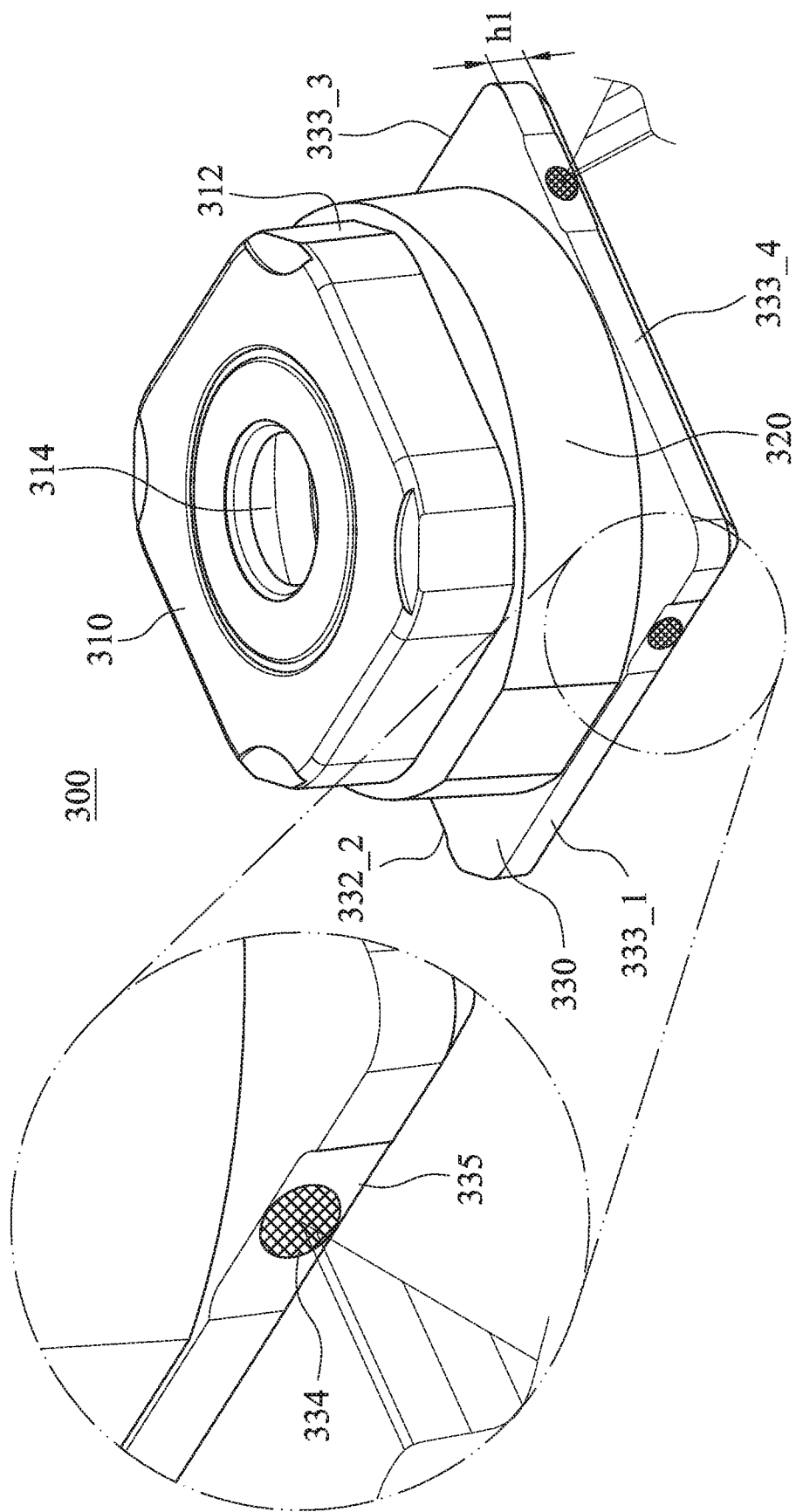
FIG. 3A is a schematic view of a plastic barrel according to the 3rd embodiment of the present disclosure.
Figure 3B:
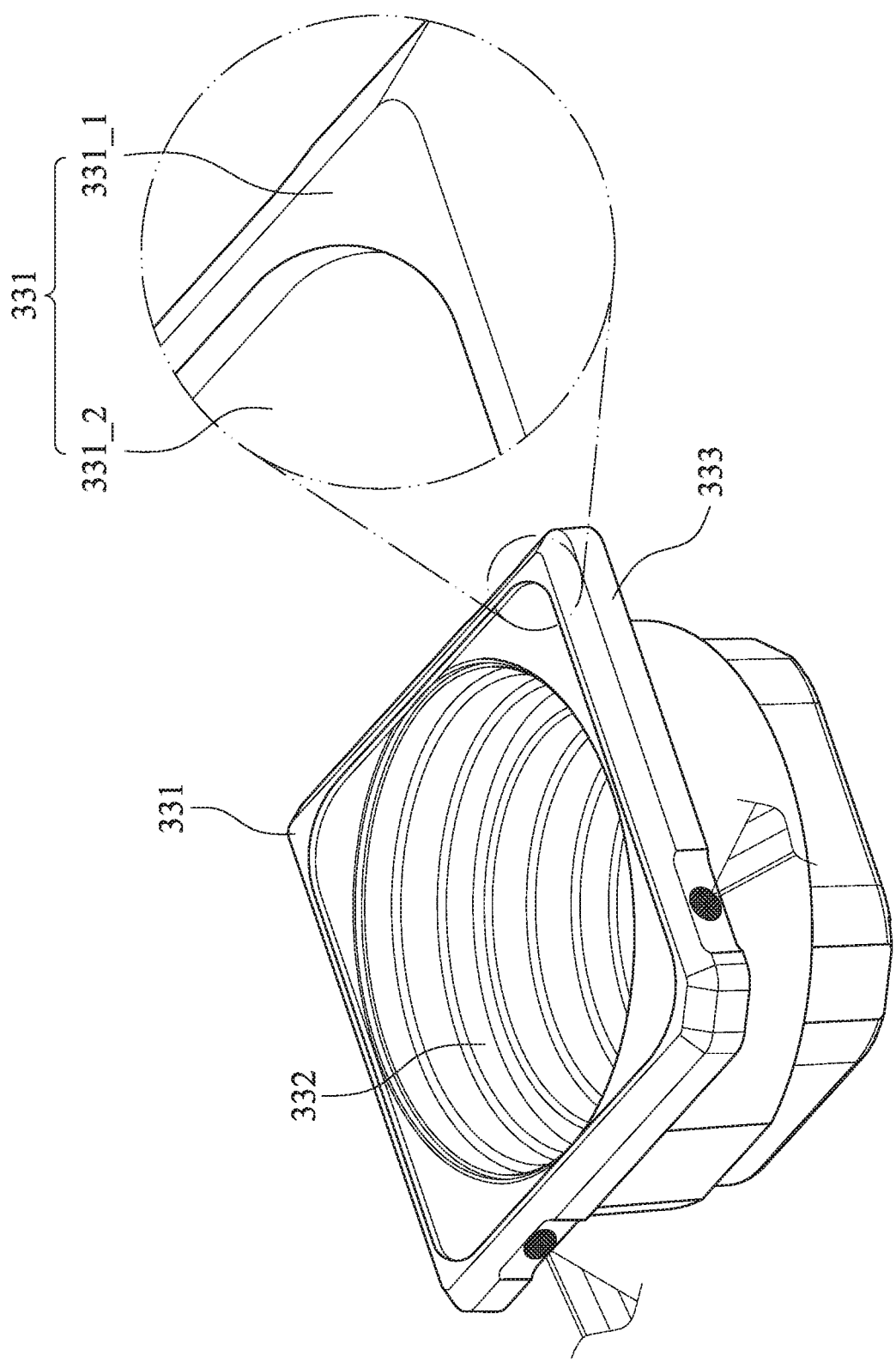
FIG. 3B is another schematic view of the plastic barrel according to the 3rd embodiment of the present disclosure.

FIG. 3A is a schematic view of a plastic barrel 300 according to the 3rd embodiment of the present disclosure; FIG. 3B is another schematic view of the plastic barrel 300 according to the 3rd embodiment of the present disclosure; FIG. 3C is a side cross-sectional view of the plastic barrel 300 according to the 3rd embodiment of the present disclosure. In FIG. 3A to FIG. 3C, the plastic barrel 300 includes an object-end portion 310, a tube portion 320, and a holder portion 330. The object-end portion 310 includes an outer object-end surface 312, an object-end hole 314, and an inner annular object-end surface 316. A part of the inner annular object-end surface 316 is connected with the outer object-end surface 312 and surrounds the object-end hole 314. The holder portion 330 may include a bottom surface 331, a bottom hole 332, and an outer bottom side 333. The bottom surface 331 includes a plane portion 331_1 and a dented portion 331_2. The dented portion 331_2 surrounds the bottom hole 332, and the plane portion 331_1 surrounds the dented portion 331_2 and is connected with the outer bottom side 333.

The tube portion 320 connects the object-end portion 310 with the holder portion 330. The tube portion 320 includes a plurality of inner annular surfaces 321, 322, 323, 324, 325, and 326, wherein the inner annular surfaces 321-326 of the tube portion 320 may form at least six parallel inner annular surfaces (e.g., parallel inner annular surfaces 321a and 322a). Specifically, in FIG. 3C of the 3rd embodiment, the six parallel inner surfaces are located on the inner annular surfaces 321-326, respectively.

In FIG. 3A, the holder portion 330 may further include at least three cut traces 334 which can be obtained by partially removing at least three gate portions 335. The way of forming the at least three cut traces 334 may be referred to the discussion related to FIG. 1E, which will not be repeated herein. Accordingly, the molding of a plastic barrel having a more complicated structure can be facilitated. In addition, the at least three cut traces 334 may accelerate the procedure of cutting and clamping the plastic barrel 300, and hence the cutting knife can be integrated with the clamping arm to improve the cutting efficiency.

In the 3rd embodiment, the object-end portion 310, the holder portion 330, and the tube portion 320 of the plastic barrel 300 may be integrally formed as a black plastic via an injection molding process.

Figure 3D:
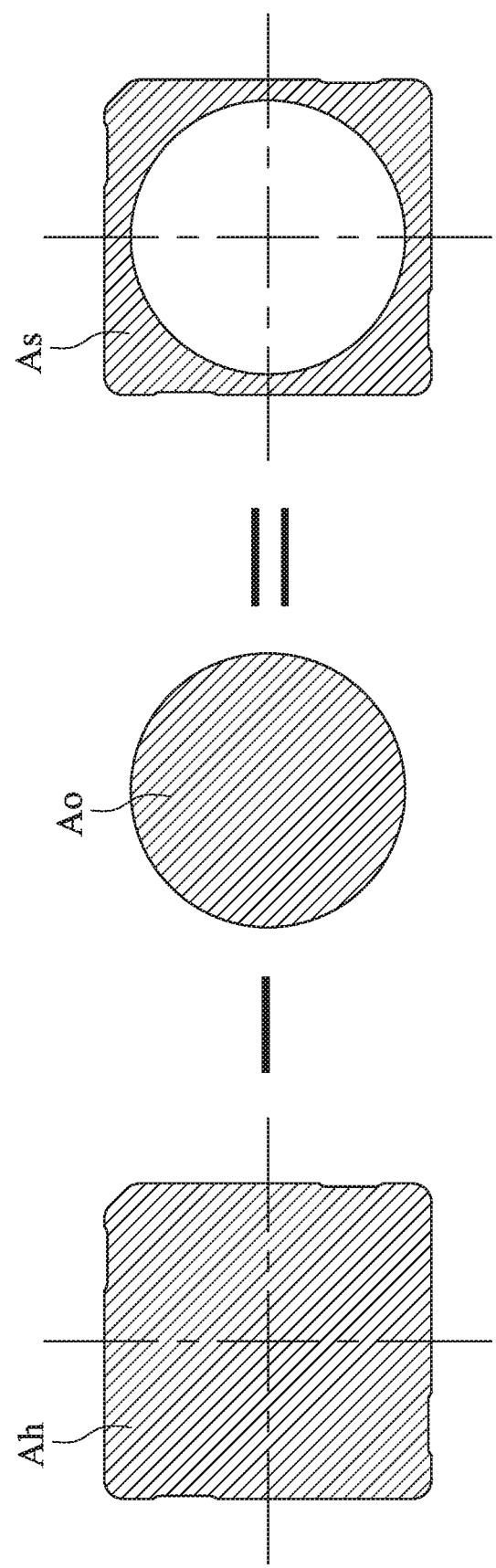
FIG. 3D is a schematic view of a parameter As according to the 3rd embodiment of the present disclosure.

FIG. 3D is a schematic view of a parameter As according to the 3rd embodiment of the present disclosure. In FIG. 3D, the shape of the holder portion 330 (e.g., a rectangle) is different from the shape of the bottom hole 332 (e.g., a circle). Moreover, the plastic barrel 300 of the present disclosure may be implemented as a non-threaded structure.

Figure 3F:
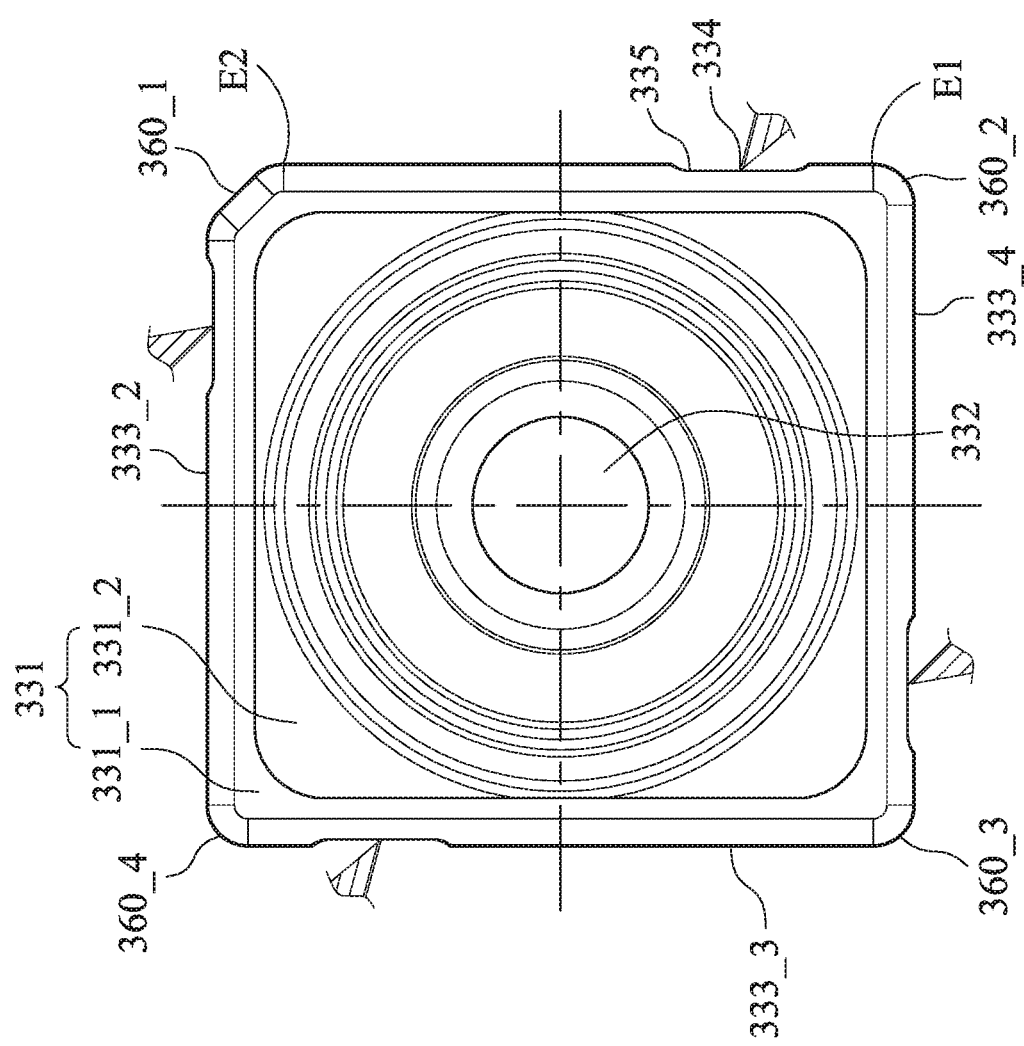
FIG. 3F is a bottom view of the plastic barrel according to the 3rd embodiment of the present disclosure.

FIG. 3E is a top view of the plastic barrel 300 according to the 3rd embodiment of the present disclosure, and FIG. 3F is a bottom view of the plastic barrel 300 according to the 3rd embodiment of the present disclosure. In FIG. 3E and FIG. 3F, the outer bottom side 333 includes at least four side surfaces 333_1, 333_2, 333_3, and 333_4. Each of the side surfaces 333_1-333_4 includes two ends E1 and E2, and one of the ends of one of the side surfaces 333_1-333_4 is connected with one of the ends of another one of the side surfaces 333_1-333_4, wherein the one of the side surfaces 333_1-333_4 is adjacent to the another one of the side surfaces 333_1-333_4. Accordingly, the design of the channel traces of injecting the injection during the injection molding process can be facilitated. Moreover, the cut traces 334 are respectively located on the side surfaces 333_1-333_4, and each of the cut traces 334 is closer to one of the ends E1 and E2 (e.g., the end E1) of the side surfaces 333_1-333_4.

In FIG. 3A, FIG. 3B, and FIG. 3C of the 3rd embodiment, an area of the bottom surface 331 is As, wherein a cross-sectional area of the holder portion 330 is Ah, i.e., the area surrounded by the outer bottom side 333, and the area As of the bottom surface 331 may be obtained by subtracting the cross-sectional area of the bottom hole 332 from the cross-sectional area of the holder portion 330 (i.e., As=Ah−Ao). A diameter of the bottom hole 332 is ψo, wherein Ao=π×(ψo/2)², i.e., the cross-sectional area of the bottom hole 332. A height of the plastic barrel 300 parallel to a central axis 350 (i.e., the optical axis) is H, a thickness of the holder portion 330 parallel to the central axis 350 is h1, and a diameter of the object-end hole 314 is ψd. The following Table 3 lists the data of the plastic barrel 300 defined according to the aforementioned parameters of the 3rd embodiment of the present disclosure as shown in FIG. 3A, FIG. 3B, FIG. 3C, and FIG. 3D.

TABLE 3

| 3rd embodiment | | | |
|---|---|---|---|
| Ψd | 1.28 mm | Ao | 14.52 mm² |
| Ψo | 4.43 mm | Ah | 25.05 mm² |
| H | 2.624 mm | As | 10.53 mm² |
| h1 | 0.55 mm | | |

4th Embodiment

FIG. 4 is a schematic view of a camera module 400 according to the 4th embodiment of the present disclosure. In FIG. 4, a camera module 400 includes a plastic barrel 100 and an optical lens assembly 410, wherein the optical lens assembly 410 is disposed in the plastic barrel 100.

In the 4th embodiment, the plastic barrel 100 is the same as the 1st embodiment, but the present disclosure is not limited thereto, which will not be repeated herein.

In the 4th embodiment, the object-end hole 114 is an aperture stop of the optical lens assembly 410, and the optical lens assembly 410 includes a plurality of lens elements 410_1, 410_2, 410_3, and 410_4, which are disposed in the plastic barrel 100 and against some optical elements (not particularly labelled). Accordingly, the light blocking elements used as an aperture stop will not be needed, and hence the mechanical complexity of the camera module 400 will be reduced.

5th Embodiment

Figure 5A:
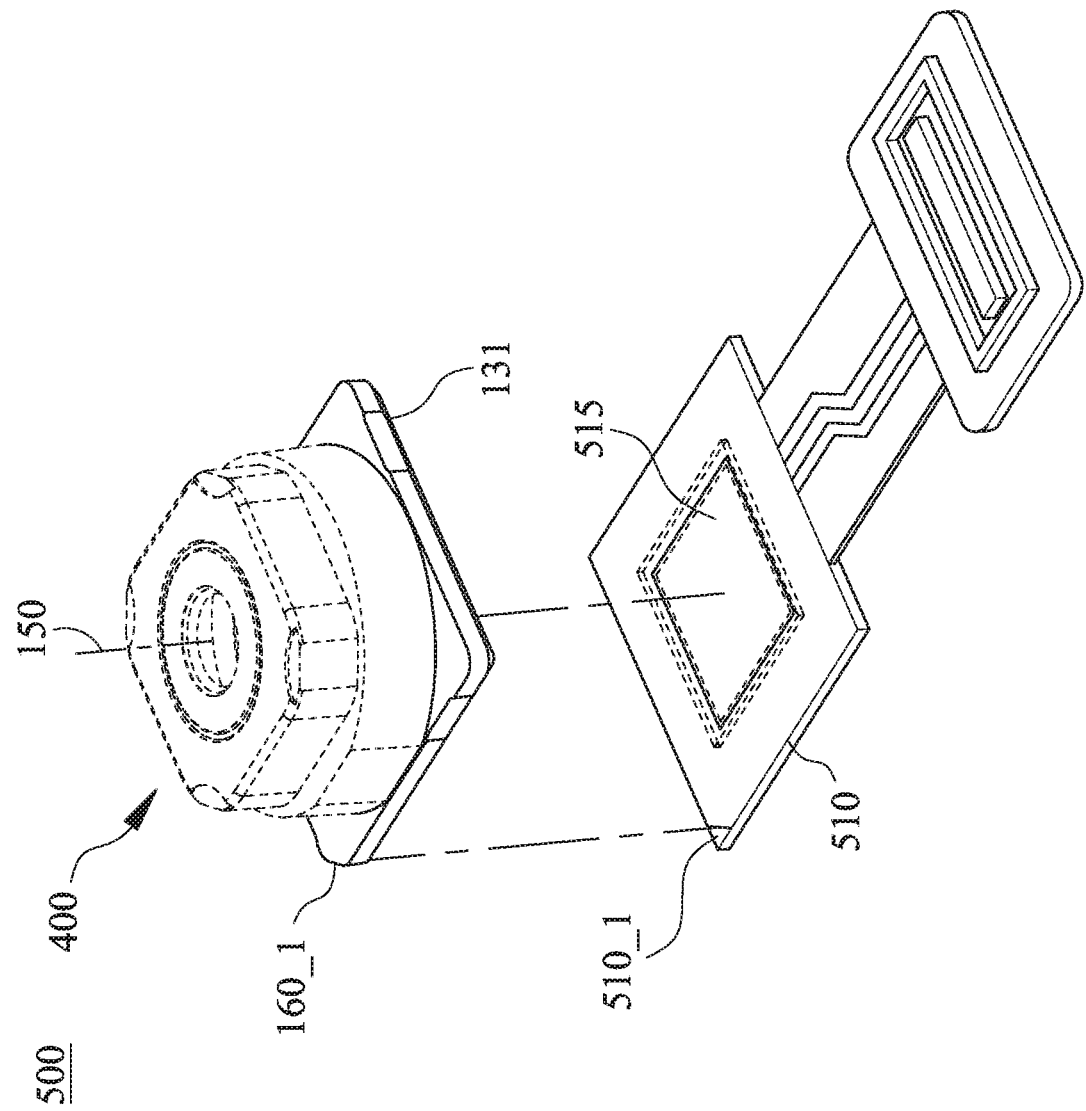
FIG. 5A is an exploded view of an electronic device according to the 5th embodiment of the present disclosure.
Figure 5B:
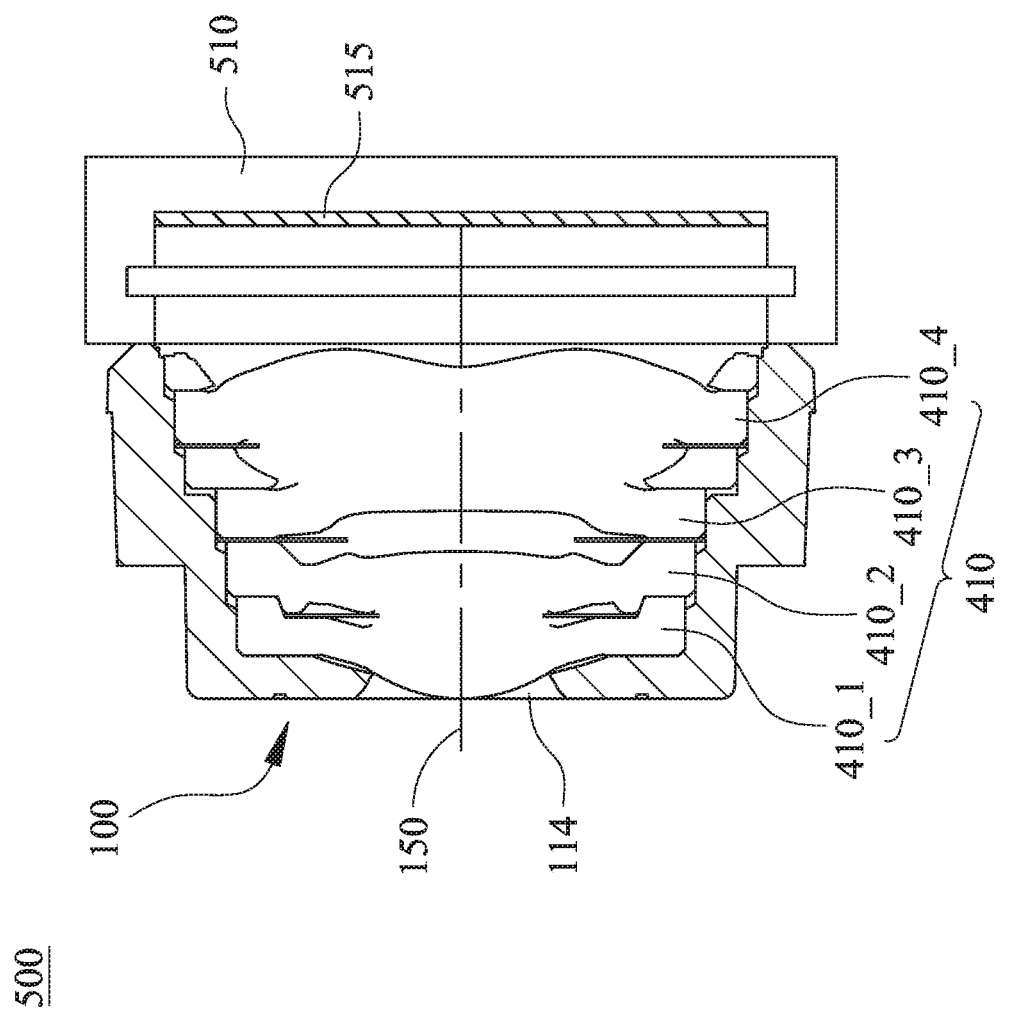
FIG. 5B is a side cross-sectional view of the electronic device according to the 5th embodiment of FIG. 5A.
Figure 5C:
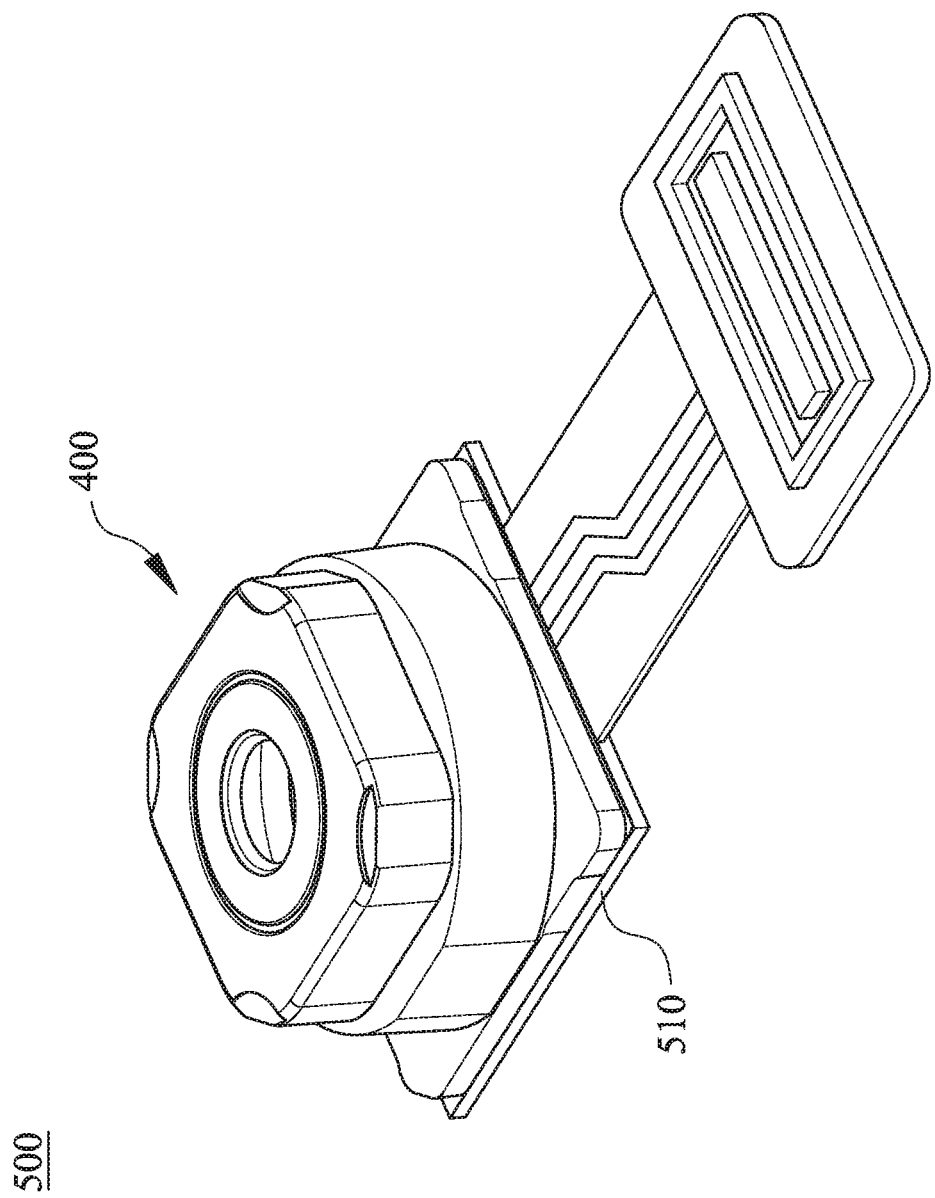
FIG. 5C is a schematic view of the assembled electronic device according to the 5th embodiment of FIG. 5A.

FIG. 5A is an exploded view of an electronic device 500 according to the 5th embodiment of the present disclosure; FIG. 5B is a side cross-sectional view of the electronic device 500 according to the 5th embodiment of FIG. 5A; FIG. 5C is a schematic view of the assembled electronic device 500 according to the 5th embodiment of FIG. 5A. In FIG. 5A, FIG. 5B, and FIG. 5C, the electronic device 500 includes the camera module 400 and an image sensor 515, wherein the camera module 400 is the same as the 4th embodiment, which includes, but not limited to, the plastic barrel 100 of the 1st embodiment.

In detail, the image sensor 515 can be disposed on a substrate 510 via aligning the corner 160_1 (i.e., the chamfered corner) of the plastic barrel 100 with a corner 510_1 of the substrate 510. Accordingly, the image sensor 515 is connected with the camera module 400 via the substrate 510. The corner 160_1 is used to prevent the camera module 400 from being erroneously assembled with the substrate 510, such that the central axis 150 is aligned with the center of the image sensor 515.

Further, in FIG. 5A, the bottom surface 131 may receive the substrate 510, and the bottom surface 131 and the image sensor 151 are on the same side of the substrate 510. Accordingly, the manufacturing process of the camera module 400 may be simplified to reduce costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A plastic barrel, comprising:
    an object-end portion, comprising:
        an object-end hole; and
        an outer object-end surface surrounding the object-end hole;
    a holder portion, comprising:
        a bottom surface;
        a bottom hole; and
        an outer bottom side, wherein the bottom surface surrounds the bottom hole and is connected with the outer bottom side; and
    a tube portion, connecting the object-end portion with the holder portion and comprising a plurality of inner annular surfaces;
    wherein the holder portion further comprises at least three cut traces obtained by partially removing at least three gate portions;
    wherein the object-end portion, the holder portion, and the tube portion are integrally formed as a black plastic via an injection molding process;
    wherein the outer bottom side comprises at least four side surfaces, each of the side surfaces comprises two ends, and one of the ends of one of the side surfaces is connected with one of the ends of another one of the side surfaces, wherein the one of the side surfaces is adjacent to the another one of the side surfaces.

2. The plastic barrel of claim 1, wherein an appearance of the holder portion is different from a shape of each of the inner annular surfaces.

3. The plastic barrel of claim 1, wherein an appearance of the holder portion is different from an appearance of the tube portion.

4. The plastic barrel of claim 1, wherein an appearance of the holder portion is different from a shape of the bottom hole.

5. The plastic barrel of claim 1, wherein the cut traces are respectively located on the side surfaces, and each of the cut traces is closer to one of the ends of the side surfaces.

6. The plastic barrel of claim 3, wherein the plastic barrel is a non-threaded structure.

7. The plastic barrel of claim 1, wherein a diameter of the bottom hole of the holder portion is larger than a diameter of the outer object-end surface of the object-end portion.

8. The plastic barrel of claim 2, wherein the inner annular surfaces of the tube portion form at least six parallel inner annular surfaces.

9. A camera module, comprising:
    the plastic barrel of claim 1; and
    an optical lens assembly disposed in the plastic barrel.

10. The camera module of claim 9, wherein the object-end hole is an aperture stop of the optical lens assembly.

11. An electronic device, comprising:
    the camera module of claim 9; and
    an image sensor connected with the camera module.

* * * * *